US011070902B2

(12) United States Patent
Perkins et al.

(10) Patent No.: US 11,070,902 B2
(45) Date of Patent: *Jul. 20, 2021

(54) CONTACT HEARING SYSTEM WITH WEARABLE COMMUNICATION APPARATUS

(71) Applicant: Earlens Corporation, Menlo Park, CA (US)

(72) Inventors: Rodney C. Perkins, Woodside, CA (US); William M. Facteau, Atherton, CA (US); Sunil Puria, Boston, MA (US)

(73) Assignee: Earlens Corporation, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,340

(22) Filed: Aug. 16, 2019

(65) Prior Publication Data

US 2019/0373352 A1 Dec. 5, 2019

Related U.S. Application Data

(63) Continuation of application No. 15/983,448, filed on May 18, 2018, now abandoned, which is a
(Continued)

(51) Int. Cl.
*H04R 1/10* (2006.01)
*G02C 11/06* (2006.01)
(Continued)

(52) U.S. Cl.
CPC ......... *H04R 1/1016* (2013.01); *G02B 27/017* (2013.01); *G02C 11/06* (2013.01);
(Continued)

(58) Field of Classification Search
CPC .... H04R 1/1016; H04R 1/028; H04R 23/008; H04R 2420/07; H04R 2460/09;
(Continued)

(56) References Cited

U.S. PATENT DOCUMENTS 5,259,032 A 11/1993 Perkins et al.
5,624,376 A 4/1997 Ball et al.
(Continued)

FOREIGN PATENT DOCUMENTS

DE 3508830 A1 9/1986
KR 100624445 B1 9/2006

OTHER PUBLICATIONS

Dundas et al. The Earlens Light-Driven Hearing Aid: Top 10 questions and answers. Hearing Review. 2018;25(2):36-39.
(Continued)

*Primary Examiner* — Tuan D Nguyen
(74) *Attorney, Agent, or Firm* — Wilson Sonsini Goodrich & Rosati, P.C.

(57) ABSTRACT

Contact hearing devices for use with a wearable communication apparatus are disclosed to provide the user with an open ear canal to hear ambient sound and sound from an audio signal. The disclosed devices and systems have an advantage of providing sound to user from the audio signal, in many embodiments without creating sound that can be perceived by others. The contact hearing device can also be used to amplify ambient sound to provide a hearing assistance to users with diminished hearing. The wearable information apparatus can be configured to couple wirelessly to the contact transducer assembly, such that the wearable information apparatus can be removed while the contact transducer assembly remains placed on the user.

8 Claims, 6 Drawing Sheets

Related U.S. Application Data continuation of application No. 15/368,487, filed on Dec. 2, 2016, now Pat. No. 10,003,877, which is a continuation of application No. 14/627,336, filed on Feb. 20, 2015, now Pat. No. 9,544,675.

(60) Provisional application No. 61/943,069, filed on Feb. 21, 2014, provisional application No. 61/943,040, filed on Feb. 21, 2014.

(51) Int. Cl.

| | | |
|---|---|---|
| G02C 11/00 | (2006.01) | |
| G02B 27/01 | (2006.01) | |
| H04R 23/00 | (2006.01) | |
| H04R 1/02 | (2006.01) | |

(52) U.S. Cl.
CPC .......... *G02C 11/10* (2013.01); *H04R 23/008* (2013.01); *G02B 2027/0178* (2013.01); *H04R 1/028* (2013.01); *H04R 2420/07* (2013.01); *H04R 2460/09* (2013.01); *H04R 2460/13* (2013.01)

(58) Field of Classification Search
CPC .............. H04R 2460/13; G02B 27/017; G02B 2027/0178; G02C 11/06; G02C 11/10
See application file for complete search history.

(56) References Cited

U.S. PATENT DOCUMENTS

| | | | |
|---|---|---|---|
| 5,737,436 A | 4/1998 | Boyden | |
| 5,804,109 A | 9/1998 | Perkins | |
| 6,068,589 A | 5/2000 | Neukermans | |
| 6,137,889 A | 10/2000 | Shennib et al. | |
| 6,190,305 B1 | 2/2001 | Ball et al. | |
| 6,349,001 B1 | 2/2002 | Spitzer | |
| 6,491,644 B1 | 12/2002 | Vujanic et al. | |
| 6,724,902 B1 | 4/2004 | Shennib et al. | |
| 6,931,231 B1 | 8/2005 | Griffin | |
| 6,940,989 B1 | 9/2005 | Shennib et al. | |
| 7,095,981 B1 | 8/2006 | Voroba et al. | |
| 7,289,639 B2 | 10/2007 | Abel et al. | |
| 7,630,646 B2 | 12/2009 | Anderson et al. | |
| 7,760,898 B2 | 7/2010 | Howell et al. | |
| 7,867,160 B2 | 1/2011 | Pluvinage et al. | |
| 7,983,435 B2 | 7/2011 | Moses | |
| 8,116,494 B2 | 2/2012 | Rass | |
| 8,157,730 B2 | 4/2012 | Leboeuf et al. | |
| 8,204,786 B2 | 6/2012 | Leboeuf et al. | |
| 8,251,903 B2 | 8/2012 | Leboeuf et al. | |
| 8,295,523 B2 | 10/2012 | Fay et al. | |
| 8,320,982 B2 | 11/2012 | Leboeuf et al. | |
| 8,351,636 B2 | 1/2013 | Ritter et al. | |
| 8,396,239 B2 | 3/2013 | Fay et al. | |
| 8,401,212 B2 | 3/2013 | Puria et al. | |
| 8,512,242 B2 | 8/2013 | Leboeuf et al. | |
| 8,545,383 B2 | 10/2013 | Wenzel et al. | |
| 8,600,089 B2 | 12/2013 | Wenzel et al. | |
| 8,647,270 B2 | 2/2014 | Leboeuf et al. | |
| 8,652,040 B2 | 2/2014 | Leboeuf et al. | |
| 8,700,111 B2 | 4/2014 | Leboeuf et al. | |
| 8,702,607 B2 | 4/2014 | Leboeuf et al. | |
| 8,715,152 B2 | 5/2014 | Puria et al. | |
| 8,788,002 B2 | 7/2014 | Leboeuf et al. | |
| 8,858,419 B2 | 10/2014 | Puria et al. | |
| 8,885,860 B2 | 11/2014 | Djalilian et al. | |
| 8,886,269 B2 | 11/2014 | Leboeuf et al. | |
| 8,888,701 B2 | 11/2014 | Leboeuf et al. | |
| 8,923,941 B2 | 12/2014 | Leboeuf et al. | |
| 8,929,965 B2 | 1/2015 | Leboeuf et al. | |
| 8,929,966 B2 | 1/2015 | Leboeuf et al. | |
| 8,934,952 B2 | 1/2015 | Leboeuf et al. | |
| 8,942,776 B2 | 1/2015 | Leboeuf et al. | |
| 8,961,415 B2 | 2/2015 | Leboeuf et al. | |
| 8,986,187 B2 | 3/2015 | Perkins et al. | |
| 8,989,830 B2 | 3/2015 | Leboeuf et al. | |
| 9,044,180 B2 | 6/2015 | Leboeuf et al. | |
| 9,131,312 B2 | 9/2015 | Leboeuf et al. | |
| 9,289,135 B2 | 3/2016 | Leboeuf et al. | |
| 9,289,175 B2 | 3/2016 | Leboeuf et al. | |
| 9,301,696 B2 | 4/2016 | Leboeuf et al. | |
| 9,314,167 B2 | 4/2016 | Leboeuf et al. | |
| 9,392,377 B2 | 7/2016 | Olsen et al. | |
| 9,427,191 B2 | 8/2016 | Leboeuf et al. | |
| 9,521,962 B2 | 12/2016 | Leboeuf | |
| 9,538,921 B2 | 1/2017 | Leboeuf et al. | |
| 9,544,675 B2 | 1/2017 | Facteau et al. | |
| 9,750,462 B2 | 9/2017 | Leboeuf et al. | |
| 9,788,785 B2 | 10/2017 | Leboeuf | |
| 9,788,794 B2 | 10/2017 | Leboeuf et al. | |
| 9,794,653 B2 | 10/2017 | Aumer et al. | |
| 9,801,552 B2 | 10/2017 | Romesburg et al. | |
| 9,808,204 B2 | 11/2017 | Leboeuf et al. | |
| 1,000,387 A1 | 6/2018 | Facteau et al. | |
| 2008/0143954 A1 | 6/2008 | Abreu et al. | |
| 2008/0144840 A1 | 6/2008 | Goldstein et al. | |
| 2008/0146890 A1 | 6/2008 | Leboeuf et al. | |
| 2010/0048982 A1 | 2/2010 | Puria et al. | |
| 2010/0312040 A1 | 12/2010 | Puria et al. | |
| 2013/0044042 A1 | 2/2013 | Olsson et al. | |
| 2013/0242283 A1 | 9/2013 | Bailey et al. | |
| 2014/0056453 A1 | 2/2014 | Olsen et al. | |
| 2015/0133716 A1 | 5/2015 | Suhami et al. | |
| 2015/0230033 A1* | 8/2015 | Sprague | G02C 5/006 381/313 |
| 2015/0245131 A1* | 8/2015 | Facteau | G02C 11/06 381/151 |
| 2015/0326965 A1* | 11/2015 | Sprague | H04R 25/65 381/317 |

OTHER PUBLICATIONS

Fay, et al. Preliminary evaluation of a light-based contact hearing device for the hearing impaired. Otol Neurotol. Jul. 2013;34(5):912-21. doi: 10.1097/MAO.0b013e31827de4b1.

Fritsch, et al. EarLens transducer behavior in high-field strength MRI scanners. Otolaryngol Head Neck Surg. Mar. 2009;140(3):426-8. doi: 10.1016/j.otohns.2008.10.016.

Gantz, et al. Broad Spectrum Amplification with a Light Driven Hearing System. Combined Otolaryngology Spring Meetings, 2016 (Chicago).

Gantz, et al. Light Driven Hearing Aid: A Multi-Center Clinical Study. Association for Research in Otolaryngology Annual Meeting, 2016 (San Diego).

Gantz, et al. Light-Driven Contact Hearing Aid for Broad Spectrum Amplification: Safety and Effectiveness Pivotal Study. Otology & Neurotology Journal, 2016 (in review).

Gantz, et al. Light-Driven Contact Hearing Aid for Broad-Spectrum Amplification: Safety and Effectiveness Pivotal Study. Otology & Neurotology. Copyright 2016. 7 pages.

Jian, et al. A 0.6 V, 1.66 mW energy harvester and audio driver for tympanic membrane transducer with wirelessly optical signal and power transfer. InCircuits and Systems (ISCAS), 2014 IEEE International Symposium on Jun. 1, 2014. 874-7. IEEE.

Khaleghi et al. Attenuating the ear canal feedback pressure of a laser-driven hearing aid. J Acoust Soc Am. Mar. 2017;141(3):1683.

Khaleghi et al. Attenuating the feedback pressure of a light-activated hearing device to allows microphone placement at the ear canal entrance. IHCON 2016, International Hearing Aid Research Conference, Tahoe City, CA, Aug. 2016.

Khaleghi et al. Mechano-Electro-Magnetic Finite Element Model of a Balanced Armature Transducer for a Contact Hearing Aid. Proc. MoH 2017, Mechanics of Hearing workshop, Brock University, Jun. 2017.

Khaleghi et al. Multiphysics Finite Element Model of a Balanced Armature Transducer used in a Contact Hearing Device. ARO 2017, 40th ARO MidWinter Meeting, Baltimore, MD, Feb. 2017.

(56) References Cited

OTHER PUBLICATIONS

Khaleghi, et al. Characterization of Ear-Canal Feedback Pressure due to Umbo-Drive Forces: Finite-Element vs. Circuit Models. ARO Midwinter Meeting 2016, (San Diego).
Lee, et al. A Novel Opto-Electromagnetic Actuator Coupled to the tympanic Membrane. J Biomech. Dec. 5, 2008;41(16):3515-8. Epub Nov. 7, 2008.
Lee, et al. The optimal magnetic force for a novel actuator coupled to the tympanic membrane: a finite element analysis. Biomedical engineering: applications, basis and communications. 2007; 19(3):171-177.
Levy et al. Light-driven contact hearing aid: a removable direct-drive hearing device option for mild to severe sensorineural hearing impairment. Conference on Implantable Auditory Prostheses, Tahoe City, CA, Jul. 2017. 4 pages.
Levy, et al. Characterization of the available feedback gain margin at two device microphone locations, in the fossa triangularis and Behind the Ear, for the light-based contact hearing device. Acoustical Society of America (ASA) meeting, 2013 (San Francisco).
Levy, et al. Extended High-Frequency Bandwidth Improves Speech Reception in the Presence of Spatially Separated Masking Speech. Ear Hear. Sep.-Oct. 2015;36(5):e214-24. doi: 10.1097/AUD.0000000000000161.
McElveen et al. Overcoming High-Frequency Limitations of Air Conduction Hearing Devices Using a Light-Driven Contact Hearing Aid. Poster presentation at The Triological Society, 120th Annual Meeting at COSM, Apr. 28, 2017; San Diego, CA.
Moore, et al. Spectro-temporal characteristics of speech at high frequencies, and the potential for restoration of audibility to people with mild-to-moderate hearing loss. Ear Hear. Dec. 2008;29(6):907-22. doi: 10.1097/AUD.0b013e31818246f6.
Notice of allowance dated Aug. 12, 2016 for U.S. Appl. No. 14/627,336.
Notice of Allowance dated Sep. 23, 2016 for U.S. Appl. No. 14/627,336.
Office Action dated Jan. 12, 2016 for U.S. Appl. No. 14/627,336.
Office Action dated Jul. 10, 2017 for U.S. Appl. No. 15/368,487.
Perkins, et al. Light-based Contact Hearing Device: Characterization of available Feedback Gain Margin at two device microphone locations. Presented at AAO-HNSF Annual Meeting, 2013 (Vancouver).
Perkins, et al. The EarLens Photonic Transducer: Extended bandwidth. Presented at AAO-HNSF Annual Meeting, 2011 (San Francisco).
Perkins, et al. The EarLens System: New sound transduction methods. Hear Res. Feb. 2, 2010; 10 pages total.
Perkins, R. Earlens tympanic contact transducer: a new method of sound transduction to the human ear. Otolaryngol Head Neck Surg. Jun. 1996;114(6):720-8.
Puria, et al. Cues above 4 kilohertz can improve spatially separated speech recognition. The Journal of the Acoustical Society of America, 2011, 129, 2384.
Puria, et al. Extending bandwidth above 4 kHz improves speech understanding in the presence of masking speech. Association for Research in Otolaryngology Annual Meeting, 2012 (San Diego).
Puria, et al. Extending bandwidth provides the brain what it needs to improve hearing in noise. First international conference on cognitive hearing science for communication, 2011 (Linkoping, Sweden).
Puria, et al. Hearing Restoration: Improved Multi-talker Speech Understanding. 5th International Symposium on Middle Ear Mechanics In Research and Otology (MEMRO), Jun. 2009 (Stanford University).
Puria, et al. Imaging, Physiology and Biomechanics of the middle ear: Towards understating the functional consequences of anatomy. Stanford Mechanics and Computation Symposium, 2005, ed Fong J.
Puria, et al. Sound-Pressure Measurements In The Cochlear Vestibule of Human-Cadaver Ears. Journal of the Acoustical Society of America. 1997; 101 (5-1): 2754-2770.
Puria, et al. Temporal-Bone Measurements of the Maximum Equivalent Pressure Output and Maximum Stable Gain of a Light-Driven Hearing System That Mechanically Stimulates the Umbo. Otol Neurotol. Feb. 2016;37(2):160-6. doi: 10.1097/MAO.0000000000000941.
Puria, et al. The EarLens Photonic Hearing Aid. Association for Research in Otolaryngology Annual Meeting, 2012 (San Diego).
Puria, et al. The Effects of bandwidth and microphone location on understanding of masked speech by normal-hearing and hearing-impaired listeners. International Conference for Hearing Aid Research (IHCON) meeting, 2012 (Tahoe City).
Puria, S. Middle Ear Hearing Devices. Chapter 10. Part of the series Springer Handbook of Auditory Research pp. 273-308. Date: Feb. 9, 2013.
Puria. Measurements of human middle ear forward and reverse acoustics: implications for otoacoustic emissions. J Acoust Soc Am. May 2003;113(5):2773-89.
Song, et al. The development of a non-surgical direct drive hearing device with a wireless actuator coupled to the tympanic membrane. Applied Acoustics. Dec. 31, 2013;74(12):1511-8.
Struck, et al. Comparison of Real-world Bandwidth in Hearing Aids vs Earlens Light-driven Hearing Aid System. The Hearing Review. TechTopic: EarLens. Hearingreview.com. Mar. 14, 2017. pp. 24-28.
U.S. Appl. No. 15/368,487 Notice of Allowance dated Feb. 20, 2018.
U.S. Appl. No. 15/368,487 Notice of Allowance dated Mar. 5, 2018.
U.S. Appl. No. 15/983,448 Office Action dated Feb. 20, 2019.
www.futuristspeaker.com. How Google Glass will Disrupt the Hearing Aid Industry? Apr. 26, 2013. Available at http://www.futuristspeaker.com/business-trends/how-google-glass-will-disrupt-the-hearing-aid-industry.
www.gizmag.com. Google files patent for bone conduction audio in Project Glass. Jan. 25, 2013. Availalbe at http://www.gizmag.com/google-glass-bone-conduction/25965.

\* cited by examiner

CONTACT HEARING SYSTEM WITH WEARABLE COMMUNICATION APPARATUS

CROSS-REFERENCE

This application is a continuation of U.S. patent application Ser. No. 15/983,448, filed May 18, 2018; which is a continuation of U.S. patent application Ser. No. 15/368,487, filed Dec. 2, 2016, now U.S. Pat. No. 10,003,877; which is a continuation of U.S. patent application Ser. No. 14/627,336, filed Feb. 20, 2015, now U.S. Pat. No. 9,544,675; which claims the benefit under 35 U.S.C. § 119(e) of U.S. Provisional Application No. 61/943,040 and U.S. Provisional Application No. 61/943,069, both filed Feb. 21, 2014; the entire disclosures of which are incorporated by reference herein.

BACKGROUND

The present disclosure relates generally to communication and various hearing systems, devices, and methods. Hearing is an important sense for people and allows them to listen to and understand others. Although significant progress has been made in providing subjects who have hearing deficiency with improved hearing aids, a wide adoption of the hearing aids among the population is still not achieved. One of the reasons is that there is still a stigma attached in wearing hearing aids, and in at least some instances users of prior hearing aids may be perceived as handicapped. This perception can be related, for example, among other things to their appearance. The hearing devices in general (that are used by users with normal hearing and with the hearing deficiency, and that are not limited to those that have hearing aids capabilities) also has a room for improvement.

Recent improvements in computer related technology have created an opportunity for people to interact, provide and have access to data. The Internet, cloud computing, smart phones and wireless technology have created an environment where users can share and access data in many ways.

Wearable computer interface devices provide a human information interface that allows users to interact and provide data to each other. However, the prior wearable computer interface devices can be less than ideal in at least some respects. For example, such devices can be somewhat larger than would be ideal. Such devices can provide a wearable display and audio to the user. However, the display can be somewhat larger than would be ideal, and the sound quality can be somewhat less than would be ideal. Earbuds, for example, can provide high sound quality for an input audio signal, however, such devices can occlude the ear canal in at least some instances and provide a less than ideal user interface where the user would both like to listen to the audio signal and listen to people with whom the user is interacting. Also, with an open ear canal, at least some of the prior hearing devices can transmit sound in a manner that is sufficiently loud for a person other than the user to perceive the sound, which can diminish the privacy of the user in at least some instances.

In light of the above, there is a need for improved listening and computer interface devices, especially those that could be used in combination with the hearing devices and systems. There is also a need for improving performance of such devices.

SUMMARY

Embodiments of the present disclosure provide improved methods and apparatus (systems) to interface people, including those who have a hearing deficiency, with information related devices, such as wearable information or wearable communication devices, including wearable displays. The systems and methods of the present disclosure provide benefits for users, both with hearing deficiency and normal hearing. Those benefits include, but are not limited to the improved quality of the sound, high fidelity, reduced or eliminated effects of occlusion (a tunnel-like hearing sensation) due to an open and/or at least widely vented ear canal, including the cosmetic benefit for hearing impaired to hide the appearance of the hearing device and/or to be perceived as modern computer users rather than handicapped. Various embodiments of the wearable communication apparatus of the present disclosure provide an open ear canal for the user to listen to ambient sound or allow the user to listen to an audio signal from a remote source, in a manner that maintains the privacy of the user. In many embodiments, a wearable information apparatus may comprise a wearable computer display combined with a contact hearing device to provide the user with an open ear canal to hear ambient sound and sound from an audio signal. The contact hearing device has the advantage of providing sound to user from the audio signal, in many embodiments without creating sound that can be perceived by others. Also, the contact hearing device can be used to amplify ambient sound to provide a hearing assistance to users with diminished hearing. The contact hearing device may comprise a contact transducer assembly configured for placement at a location of the user, for example, on a lateral side of the eardrum or tympanic membrane of the user, or in the middle ear of the user. The wearable information apparatus can be configured to couple wirelessly to the contact transducer assembly, such that the wearable information apparatus can be removed and the contact transducer assembly remains placed on the user.

According to some embodiments, a wearable communication apparatus is provided. The wearable communication apparatus comprising a support structure configured to be wearable by a user and a contact transducer assembly configured to produce vibrations of the tissue of the user. The apparatus further comprises a circuitry at least partially positioned on the support structure and configured to drive the contact transducer assembly with an audio signal. The contact transducer assembly may be driven by an output transducer coupled to the circuitry. In some embodiments the contact transducer assembly may reside on a lateral surface of the eardrum, and in some embodiments it may be positioned in a middle ear of the user. The output transducer coupled to the circuitry may comprise a coil, a light source, RF source or ultrasound source. The wearable communication apparatus is shaped and configured to provide an open ear canal or at least widely vented ear canal. The contact transducer assembly contacts an eardrum of the user to drive the eardrum with the audio signal and the open ear canal allows the eardrum to vibrate in response to the audio signal to provide both the ambient sound and the audio signal to the user. The contact transducer assembly may be configured to produce wide bandwidth vibrations of the eardrum. In various embodiments, the bandwidth may comprise a low frequencies below 200 Hz and high frequencies above 6 kHz, in further embodiments the bandwidth may comprise a low frequencies below 500 Hz and high frequencies above 5 kHz.

According to some embodiments, a contact hearing device coupled to a wearable information or wearable communication apparatus is provided. The contact hearing device can be coupled to the wearable information apparatus in one or more of many ways. In many embodiments, the wearable information apparatus comprises communication circuitry, such as wireless communication circuitry, to drive the contact hearing device. The wireless communication circuitry may comprise in various embodiments a variety of sources, for example, an RF source, an ultrasound source, a magnetic field generator to transmit a signal electromagnetically to the contact hearing device, or a light source to transmit the signal optically to the contact hearing device, just to name a few. For example, in some embodiments with the electromagnetic source, the contact hearing device may be responsive to variations in the generated magnetic field to transmit the audio signal. While various examples of the embodiments are described in reference to the magnetic source or the light source, such descriptions are provided by way of the example only and people skilled in the art would appreciate that other energy sources are within the scope of the present disclosure, and various embodiments and implementations may be adjusted to accommodate such alternative energy sources. In many embodiments, the wireless communication circuitry is configured to transmit power and signal to the contact transducer assembly. The wireless communication circuitry can be integrated with the information apparatus (e.g. wearable communication apparatus or wearable information apparatus), or may comprise a removable module configured to provide wireless coupling between the wearable information apparatus and the contact hearing device. The removable module may be placed, for example, in the ear canal and may be electrically connected to the wearable information apparatus. It may alternatively be wirelessly connected to the wearable information apparatus using radio frequencies (RF). In many embodiments the removable module may comprise an electrical input to receive an electrical audio signal and, for example, an optical output to transmit sound to the contact hearing device with light.

According to some embodiments, the wearable communication apparatus may comprise at least 2 elongate elements sized to extend from the support structure (e.g., from the extensions on each side of the support structure) to each of the ear canals of the user, each comprising one or more of an electrical conductor to transmit the audio signal or optical fiber(s) to transmit optical signal. One or both of the elongate elements may be supported by the support structure and may be removably connected to the support structure.

The contact hearing device comprises a transducer that receives the audio signal and couples the transducer to the user with contact of a transducer structure to the tissue. The contact hearing device may comprise one or more of many configurations and may comprise an implantable hearing device, or a hearing device placed on an eardrum of the user, and combinations thereof, for example. The transducer may comprise one or more of many transducers such as a magnet, a coil, a balanced armature, a piezo electric transducer, a photo-strictive material, and combinations thereof. The transducer structure contacting the tissue may comprise one or more of a support to contact tissue coupled to the transducer, such as an EarLens® platform available from the assignee of the present application, a support structure placed on the eardrum, a bone contact structure to couple the transducer to bone, a bone anchor structure to anchor the transducer contact structure to bone, a reed of a balanced armature transducer, an extension from a reed of a balanced armature transducer, a structure of a piezo electric transducer, or a structure of a photo-strictive material, and combinations thereof.

In those embodiments where the optical signal is used, the optical signal may comprise one or more of many optical signals, and may comprise, for example, a pulse modulated signal such as a one or more of a pulse width modulated signal or a pulse density modulated signal.

A module for use with the systems and apparatus according to the present disclosure can be configured in one or more of many ways, and may comprise a circuitry to convert an input audio signal into, for example, electromagnetic signal, or an optical signal, such as a pulse modulated optical signal. The input audio signal may comprise an analog input audio signal, and the circuitry can be configured to drive, for example in some embodiments, a light source to provide a pulse modulated optical signal to the contact hearing device. The circuitry of the module or module circuitry can be configured such that the analog audio signal provides both power and signal to the circuitry. The module circuitry may comprise one or more light sources such as light emitting diodes or laser diodes, or in other embodiments, for example, magnetic field generators, such as magnetic coil. The energy from the module can provide both power and signal to the contact hearing device.

According to another aspect, various methods are provided for implementing, coupling and/or using a contact hearing system with a wearable communication apparatus as described in the present disclosure. For example, according to some embodiments, the method may comprise: providing a support structure configured to be wearable by a user, the support structure configured to support a circuitry at least partially positioned on the support structure; and driving a contact transducer assembly configured to produce vibrations of a tissue of a user with an audio signal from an output transducer coupled to the circuitry.

Other features and advantages of the devices and methodology of the present disclosure will become apparent from the following detailed description of one or more implementations when read in view of the accompanying figures. Neither this summary nor the following detailed description purports to define the invention. The invention is defined by the claims.

BRIEF DESCRIPTION OF THE DRAWINGS

A better understanding of the features and advantages of the present disclosure will be obtained by reference to the following detailed description that sets forth illustrative embodiments, in which the principles of the disclosure are utilized, and the accompanying drawings of which.

DETAILED DESCRIPTION

Figure 1A:
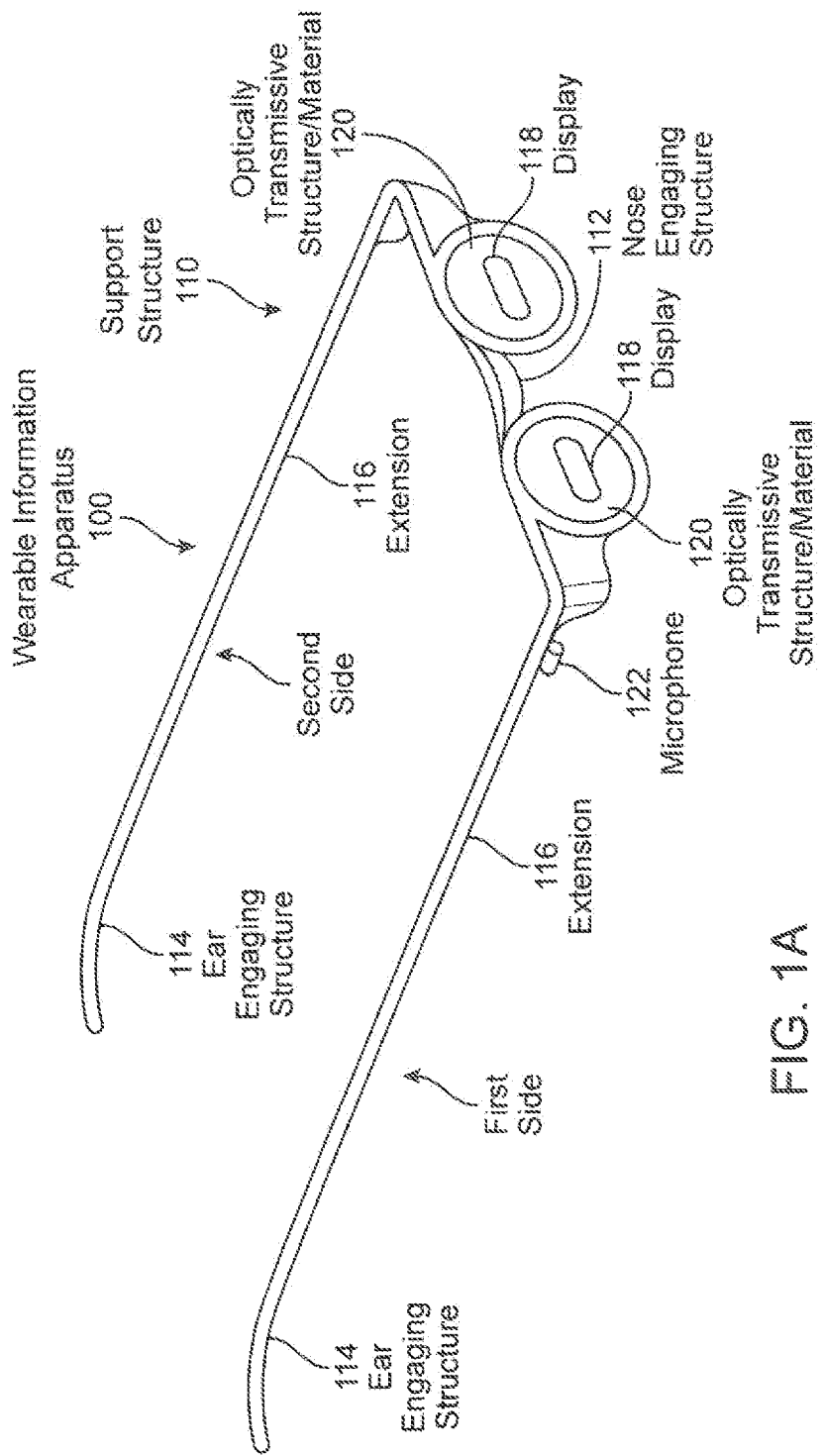
FIG. 1A shows an example of a wearable communication apparatus that may be used with various contact hearing devices of the present disclosure.

In the following detailed description, reference is made to the accompanying drawings that show, by way of illustration, some examples of embodiments in which the disclosure may be practiced. In this regard, directional terminology, such as "right", "left", "upwards", "downwards", "vertical", "horizontal" etc., are used with reference to the orientation of the figure(s) being described. Because components or embodiments of the present disclosure can be positioned or operated in a number of different orientations, the directional terminology is used for purposes of illustration and is in no way limiting. The terms "coupled," or "attached," or "mounted" as used herein, may mean directly or indirectly coupled, attached, or mounted through one or more intervening components. It should be noted that the drawings are not to scale and are intended only as an aid in conjunction with the explanations in the following detailed description. In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes and configurations of the elements as drawn, are not intended to convey any information regarding the actual shape or configuration of the particular elements, and have been solely selected for ease of recognition in the drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above, and structural or logical changes may be made to various embodiments without departing from the scope of the present disclosure. Various other modifications, changes and variations which will be apparent to those skilled in the art may be made in the arrangement, operation and details of the method and apparatus of the present disclosure provided herein without departing from the spirit and scope of such disclosure.

The embodiments and/or features of the embodiments disclosed herein can be combined in one or more of many ways to provide an improved communication apparatus of the present disclosure.

FIG. 1A shows an example of a communication apparatus, such as a wearable information apparatus 100, in accordance with some of the embodiments. While FIG. 1A shows a wearable apparatus in the form of eye glasses, other types of wearable communication devices may be used with the contact hearing devices of the present disclosure. The apparatus shown in FIG. 1A comprises a support structure 110 to support the components of the apparatus. The support structure 110 may comprise a nose engaging structure 112 and one or more ear engaging structures 114. One or more extensions 116 may extend between the nose engaging structures and the one or more ear engaging structures. The support structure may be shaped to extend all around a back of the user's head, if desired, or it may have a variety of shapes and configurations (including straight, curved, angled and combinations of the above).

The apparatus may comprise one or more displays 118 locatable in front of one or both eyes of a user. The user has a first side and a second side, such as left side and a right side. The apparatus comprises a corresponding first side and a second side, to place components of the apparatus at intended locations on the first and second sides of the user, respectively. The one or more displays 118 may comprise a first display positioned on the support structure 110 so as to be locatable in front of a first eye of the user and a second display positioned on the support structure so as to be locatable in front of a second eye of the user. While in some embodiments, the wearable apparatus may be in a form of a simple prescription or non-prescription glasses or sunglasses without any "display" capabilities, in some embodiments the display 118 may comprise an optically transmissive material 120, such as a lens or glass, and the display may comprise coatings to selectively transmit the image shown to the user. The display 118 may be made of any suitable material and it may be made transparent for user's convenience. In those embodiments where the image is shown on the display 118, it may be super imposed with the image the user sees through the optically transmissive material.

The support structure may comprise one or more components of an eyeglass frame, for example. The optically transmissive material may comprise lenses of comprising a prescription or other optical correction beneficial to the user, for example.

Although not shown in FIG. 1A, the wearable information apparatus may comprise a power supply such as a battery, and a communication circuitry, such as wireless communication circuitry, to couple, for example, a separate or remote information/communication apparatus such as a smart phone or gateway, a tablet computing device, or a laptop computer, for example. The wireless communication circuitry can transmit information between the wearable information apparatus and one of the remote or separate information/communication devices, such as the smart phone, for example. The smart phone may comprise one or more of many known smart phones such as an iPhone™, or an Android™ phone such as a phone commercially available from Samsung, for example. The connection between the phone and the wearable apparatus can be at least partially wired, for example, or it can be wireless, for example, using cellular technology, Bluetooth® technology, WiFi or any other appropriate technology. The remote device may also be accessed, for example, through the Internet. Although the connection with the wearable display apparatus can be to a smart phone, the wearable apparatus can be connected to a computer, such as a notebook computer or a back end server, for example.

The wearable information apparatus comprises at least one microphone 122 to detect ambient sound. The at least one microphone can be located on the support structure in one or more of many locations. While FIG. 1A shows the microphone 122 located near the corner of the support structure on the first side, it may be located at any convenient location on the support structure, including at the bottom of the support structure, on the nose engaging structure 112, or on both the first and the second sides of the support frame. In some embodiments, the microphone 122 may be located near or inside the ear canal of the user, for example, as described in various embodiments below. In many embodiments, the at least one microphone comprises a directional microphone oriented to where the user is looking.

Figure 1B:
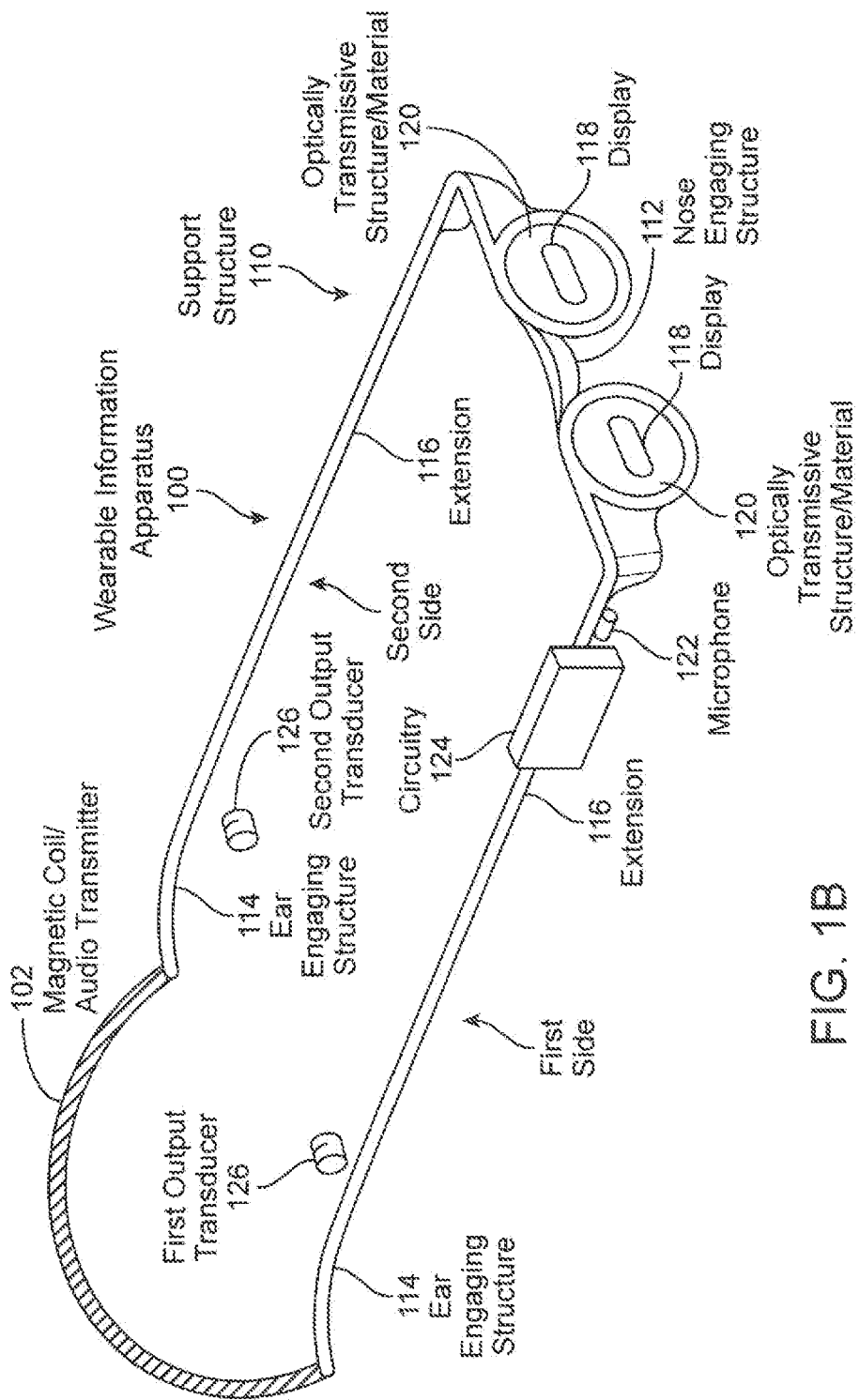
FIGS. 1B and 1C show examples of wearable communication apparatus, in accordance with some embodiments.

Another example of a wearable communication apparatus is shown in FIG. 1B. According to the embodiments of the example of FIG. 1B, the wearable communication apparatus 100 may comprise an audio transmitter 102, which may be in the form of a magnetic coil, and it may be coupled to the support structure or support frame 110. When worn, the magnetic coil, for example, may wrap around the back of the user's head. The audio transmitter may be operative to transmit audio signals to first and second output transducers 126. The audio transmitter may generate a magnetic field. The first and second output transducers 126 may comprise high-energy permanent magnets and/or may be responsive to variations in the generated magnetic field to transmit the audio. The wearable information apparatus of FIG. 1B also shows a microphone 122 and a circuitry 124 which is described in more detail below.

Figure 1C:
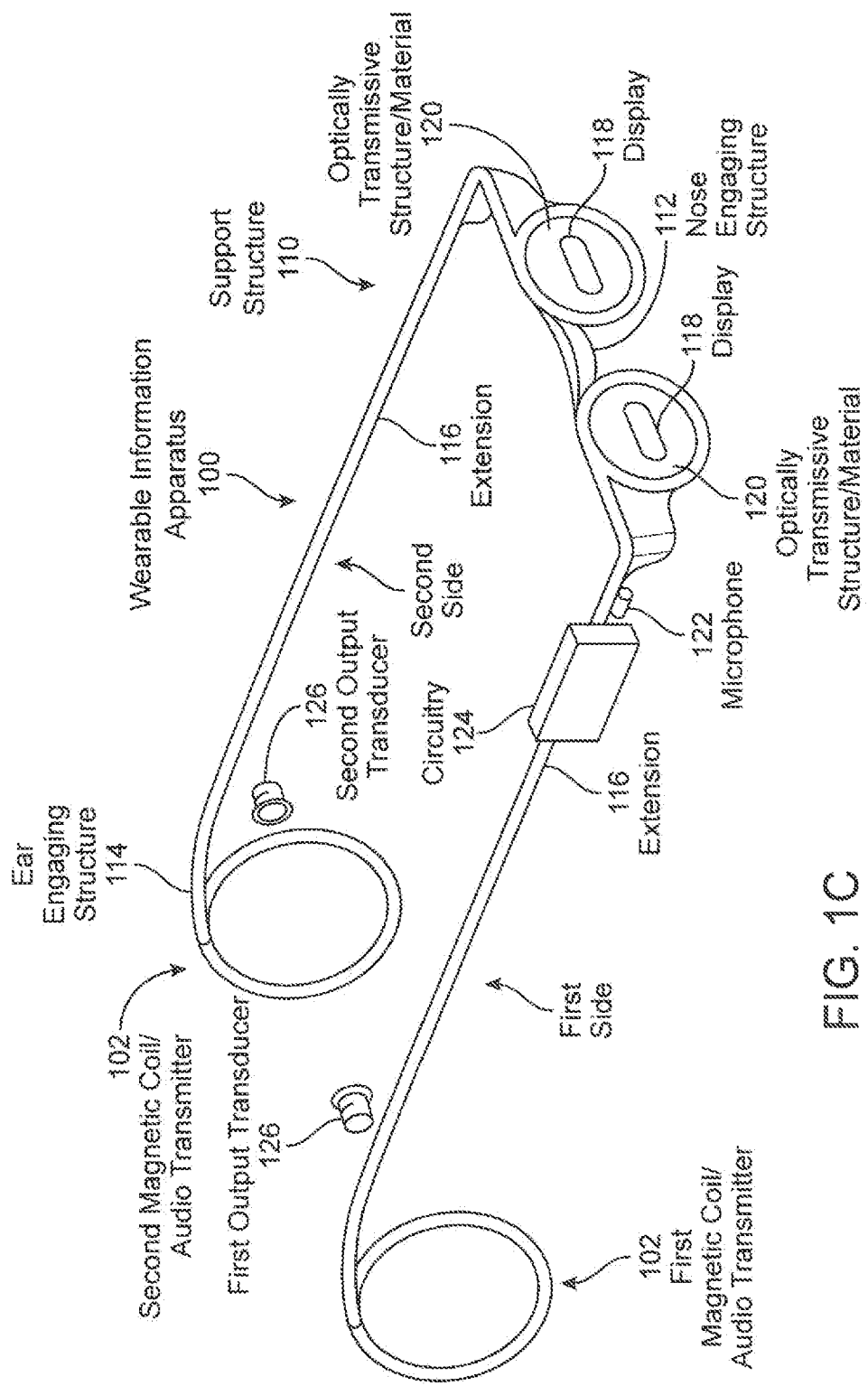

FIG. 1C shows yet another example of a wearable communication apparatus, in accordance with further embodiments. As shown in FIG. 1C, the wearable communication apparatus may have many of the same components as the wearable communication apparatus of FIG. 1B. While the magnetic coil or audio transmitter of the wearable communication apparatus of FIG. 1B may comprise a single magnetic coil wrapped around the head of the user or at least the back of the head of the user, the wearable communication apparatus of FIG. 1C may comprise a first magnetic coil or audio transmitter 102 for the first side of the apparatus and second magnetic coil or audio transmitter 102 for the second side of the apparatus. The first magnetic coil or audio transmitter 102 may wirelessly couple to the first output transducer 126 to transmit the first sound to the user, for example, a right audio component. The second magnetic coil or audio transmitter 102 may wirelessly couple to the second output transducer 126 to transmit a second sound to the user, for example, a left audio component. Together, the first and second magnetic coils or audio transmitters 102 may provide high-quality stereo sound to the user.

Figure 2A:
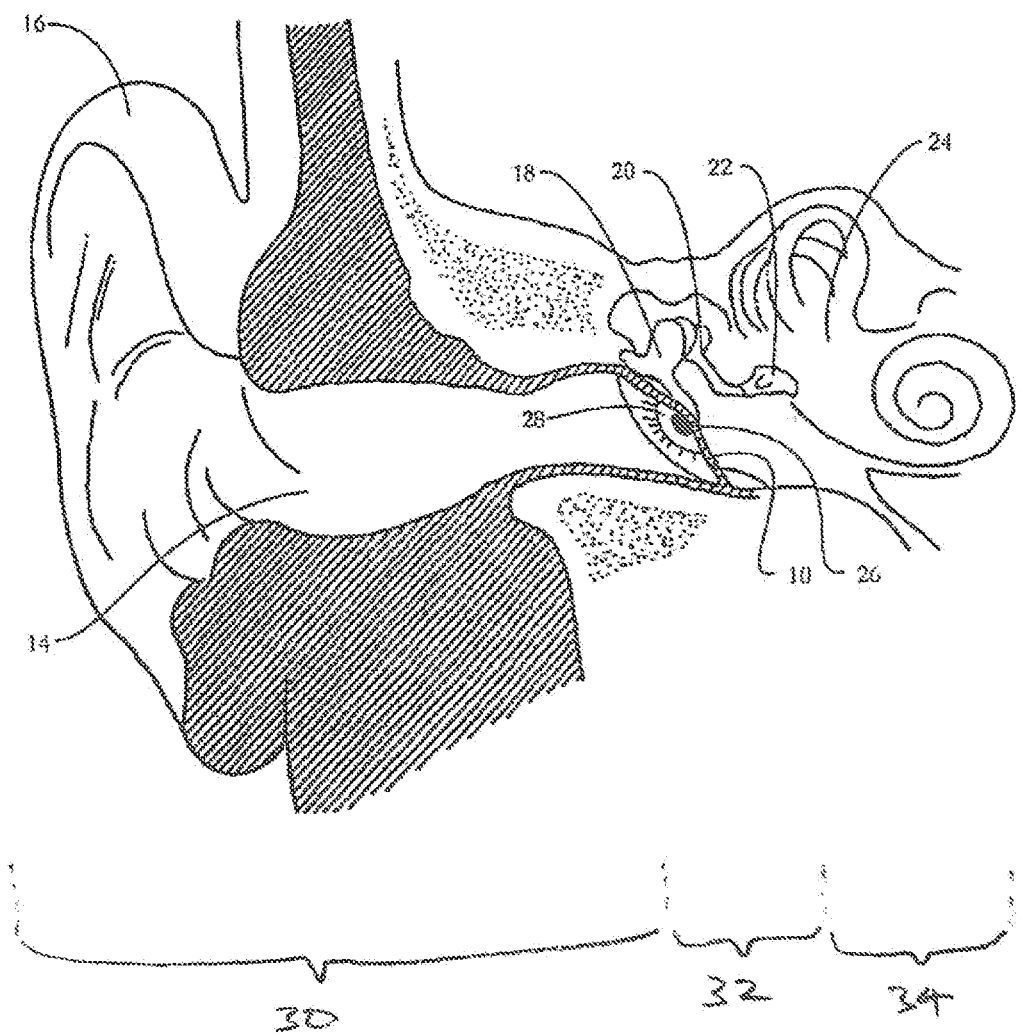
FIG. 2A shows an example of an output transducer of the contact hearing device coupled to an ear of a user.

FIG. 2A shows an example of an output transducer 26 coupled to an ear of a user that can be used with the wearable communication apparatus of various embodiments. The ear comprises an outer ear 30, a middle ear 32, and an inner ear 34. The outer ear 30 comprises primarily of the pinna 16 and the ear canal 14. The middle ear is bounded by the tympanic membrane (ear drum) 10 on one side, and contains a series of three tiny interconnected bones: the malleus (hammer) 18, the incus (anvil) 20 and the stapes (stirrup) 22. Collectively, these three bones are known as the ossicles or the ossicular chain. The malleus is attached to the tympanic membrane 10 while the stapes, the last bone in the ossicular chain, is coupled to the cochlea 24 of the inner ear.

FIG. 2A depicts an embodiment wherein a transducer 26 resides on the exterior or lateral surface of the tympanic membrane 10, which is the surface that faces the ear canal 14. By residing on the surface is meant that the transducer 26 is coupled or placed in contact (directly or through some support structure) with an exterior surface of the tympanic membrane. The transducer 26 may comprise one or more of many transducers, including without limitations, a magnet and a coil, a balanced armature transducer, a piezoelectric transducer, a photostrictive transducer, and combinations thereof. For example, in the implementations according to the example of FIG. 1B, the transducer 26 may comprise a high-energy permanent magnet.

According to one example of the methodology for positioning the transducer 26 to reside on the tympanic membrane or eardrum 10, one may employ a contact transducer assembly that includes the transducer 26 and a support means 28. The support means 28 may be attached to (directly or indirectly), or may float on, a portion of the tympanic membrane 10, for example, at the surface that is the opposite to a surface of the support means 28 that couples to the transducer 26. The support means 28 may be a biocompatible structure with a surface area sufficient to support the transducer 26, and may be vibrationally coupled to the tympanic membrane 10, for example, on a lateral (ear canal) side. The surface of the support means 28 that is attached to the tympanic membrane may substantially conform to the shape of the corresponding surface of the tympanic membrane, particularly the umbo area of the tympanic membrane. A surface wetting agent, such as mineral oil, may be used to enhance the ability of the support means 28 to form a weak but sufficient attachment to the tympanic membrane through surface adhesion.

Figure 2B:
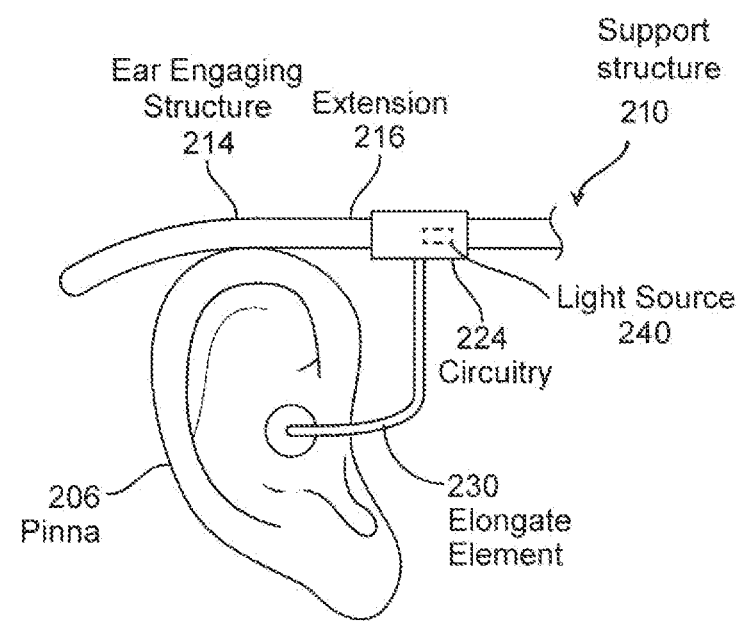
FIG. 2B shows an example of a wearable information apparatus with a contact hearing device coupled to an ear of a user.
Figure 2B:
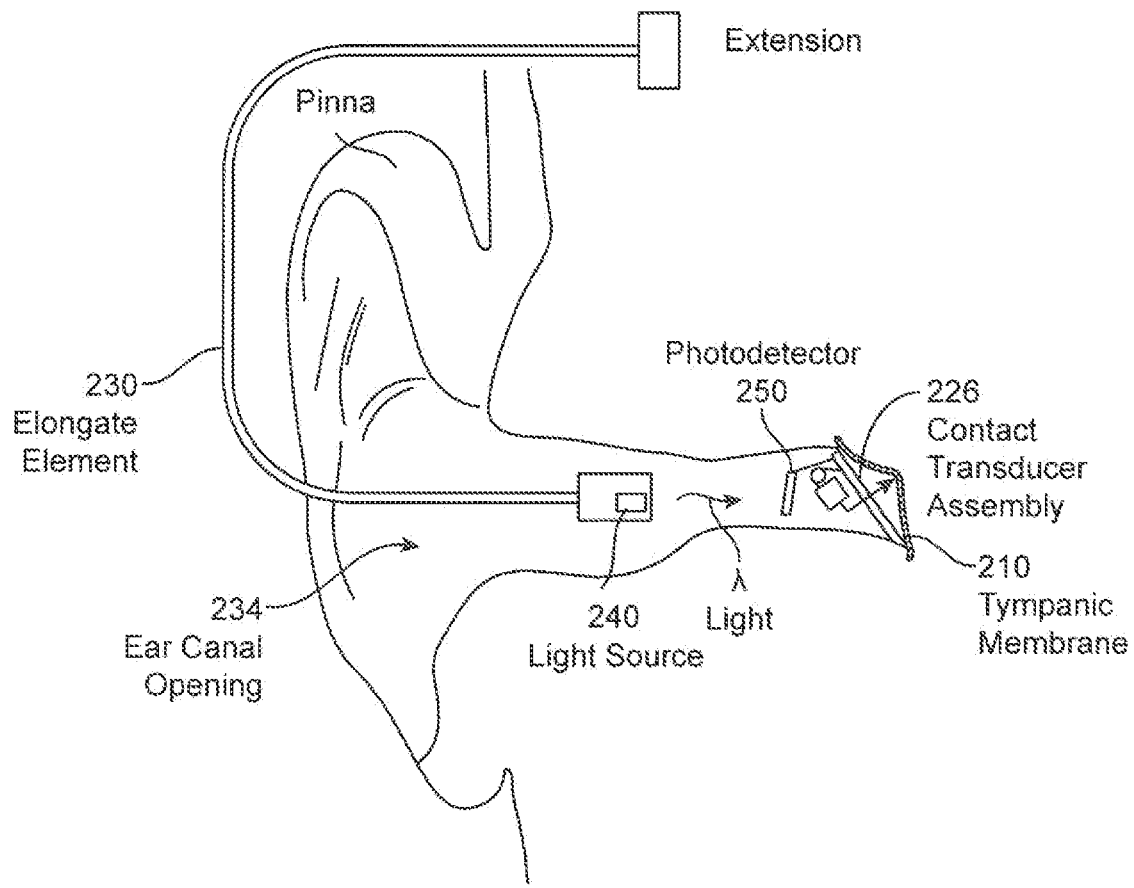

FIG. 2B shows an example of a a wearable information apparatus, such as one shown in FIG. 1A, coupled to an ear of a user and implementing a light source as the energy source. The apparatus comprises a circuitry 224 which may be supported with the extension 216 of the support structure 210, for example, in a way similar to how the circuitry 124 is supported with the extension 116 of the support structure 110 shown in FIG. 1B. In many embodiments, depending on particular implementation, the circuitry may comprise circuitry to convert an audio signal, for example, into a varying magnetic field, or into an optical signal, including a pulse modulated optical signal, to transmit power and signal to the user. The audio signal may comprise an audio signal from an external source, such as wireless signal from a cellular phone connection, or music signal from a stored music library such as iTunes, for example. The audio signal may comprise an audio signal from a microphone supported with the support structure, for example, as shown in FIGS. 1A-1C. Examples of circuitry to transmit power and signal, for example, with an optical signal, suitable for combination in accordance with the present disclosure are described in the following U.S. Pat. Nos. 8,396,239 and 8,715,152; the full disclosures of which are incorporated herein by reference. The circuitry 224, which may be supported with the support structure 210, may comprise a power source such as a battery (or multiple batteries of various forms, including rechargeable batteries) and wireless communication circuitry to receive the audio signal, for example. The wearable communication device may include a port to connect to the power source, for example, to recharge one or more batteries, without removing them. In some embodiments, optionally, as shown by the dotted line in the top portion of FIG. 2B, the circuitry 224 may comprise a light source to drive the contact transducer assembly. In such implementation, one or more optical fibers may extend from the light source 240 and circuitry 224 into an ear canal of the user. In other implementations (as described below and shown in reference to the lower portion of FIG. 2B), the light source may be located in the ear canal.

The contact transducer assembly can be located in one or more of many locations to transmit sound to the user with direct contact of the transducer assembly to the tissue, such as the eardrum, to vibrate it. In many embodiments, the contact transducer assembly contacts an eardrum (tympanic membrane) of the user. In the example shown in FIG. 2B, the contact transducer assembly 226 may comprise one or more photodetectors 250 to receive light and an electromechanical transducer to drive the tympanic membrane with energy from the photodetectors. Examples of various contact transducer assemblies suitable for use with the wearable communication apparatus of the present disclosure are described in the following U.S. patents and published applications: U.S. Pat. Nos. 7,289,639; 8,858,419; 7,867,160; and 2014/0056453, the full disclosures of which are incorporated herein by reference.

The contact hearing devices with the contact transducer assembly according to the present disclosure when used in conjunction with the wearable communication apparatus provide substantial advantages and benefits to both hearing impaired users and users with the normal hearing. The novel apparatus, devices and systems as disclosed herein allow the user enjoying the benefits of the wearable communication device while at the same time achieving both the improved quality of the sound with the wide bandwidth and eliminating occlusion which is present with the use of the existing ear buds of the wearable information devices. The novel apparatus, devices and systems of the present disclosure provide an open and/or at least widely vented ear canal, which allows the user to hear ambient sound, including high and low frequencies localization cues. For example, a configuration of the input transducer assembly and transmitter assembly as described in various embodiments provides an open ear canal (e.g., magnet and coil configurations of FIGS. 1B and 1C, or optical configuration of FIG. 2B). The sound processor for use with the embodiments of the present disclosure may have a bandwidth that is larger than 4 kHz, or larger than 6 kHz. The contact hearing devices with wearable communication apparatus of the present disclosure allow users to perceive sound at low and high frequencies, for example, below 500 Hz and further below 200 Hz, and, for example, above 5 kHz and further above 6 kHz.

The at least one microphone 122 can be placed in one or more of many locations on the support structure, as shown by example in FIGS. 1A-1C. In many embodiments, the microphone 122 comprises a directional microphone oriented toward the field of view of the "glasses" of the wearable display or wearable communication apparatus. The at least one microphone 122 may comprise a plurality of microphones, for example a first microphone 122 on a first side and a second microphone 122 on a second side of FIGS. 1A-1C. For users having a diminished hearing, the at least one microphone can be located near an opening of the ear canal to provide spatial localization cues to the user. Alternatively, the at least one microphone 122 may comprise a microphone located away from the ear canal opening to inhibit feedback. In many embodiments, the at least one microphone comprises a first microphone near the ear canal opening and a second microphone away from the ear canal opening, as described in U.S. Pat. No. 8,401,212, the entire disclosure of which is incorporated herein by reference.

In many embodiments an elongate element 230 shown in FIG. 2B may extend from the circuitry 224 to the ear canal opening 234 to transmit the audio signal to the contact transducer assembly 226. The elongate element 230 may comprise one or more of an electrical conductor to transmit an electrical signal or an optical waveguide such as an optical fiber to transmit an optical signal to the contact transducer assembly. The elongate element 230 comprising the electrical conductor can extend, for example, to a light source 240 that may be placed in the ear canal 234 as shown at the bottom portion of FIG. 2B. Alternatively, if the light source is supported with the support structure or frame 210 of the wearable information apparatus, for example, as part of the circuitry 224, the elongate element 230 comprising the optical fiber(s) may extend from a first end adjacent a light source supported with the support structure to the ear canal to transmit light energy to the contact transducer assembly.

The elongate element 230 can be connected to the extension 216 of the support structure 210 such that the elongate element can be removed with the support structure when the wearable communication apparatus is removed and the contact transducer assembly may remain in contact with the user. Examples of the elongate elements suitable for combination in accordance with embodiments of the present disclosure are described in U.S. Pat. No. 8,295,523, the entire disclosure of which is incorporated herein by reference. As described in the U.S. Pat. No. 8,295,523, the elongate support 230 may be configured to flex and/or bend to accommodate user motion and individual user characteristics, while providing support, for example, to an energy delivery transducer and/or a microphone (in those embodiments where at least one microphone is positioned inside the ear canal).

Figures 3A, 3B:
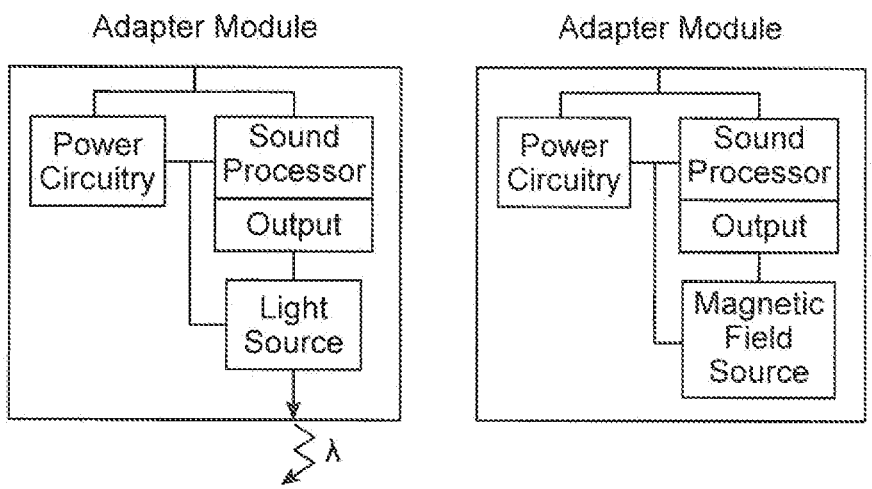
FIGS. 3A and 3B show examples of an adapter module (module), in accordance with various embodiments.

FIGS. 3A and 3B show examples of a module or an adapter module, in accordance with various embodiments. In the example of FIG. 3A, the adapter module comprises an analog input to receive an analog input signal, such as an analog signal capable of driving an ear bud. The module comprises power circuitry coupled to the analog input. The power circuitry may comprise circuitry to convert the analog input signal into a DC signal to power the sound processor and light source. The power circuitry may comprise a storage device such as a battery or capacitor to provide electrical energy to the sound processor and the light source. The adapter module of the example of FIG. 3B comprises a magnetic field source instead of a light source. The sound processor may comprise one or more of many known sound processors, which may be programmed to implement various embodiments of the present disclosure.

Embodiments of the systems of the present disclosure may be comprised of various modules, for example, sound processing modules. Each of the modules can comprise various sub-routines and may be separately compiled and linked into a single executable program.

Depending on a particular embodiment, the sound processor converts the analog input signal, for example, into a pulse modulated output signal or a magnetic signal (FIGS. 3A and 3B). The magnetic signal can be used to drive a magnetic field source or generator, which may comprise, for example, a magnetic coil. The pulse modulated output signal can be used to drive a light source. The light source may comprise an LED or laser diode, for example. The light source can be coupled to the photodetector as described herein.

The adapter module can be configured in one or more of many ways. In many embodiments, the adapter module may comprise a shape profile for placement in the ear canal of the user. The analog input is directed toward the ear canal opening and, for example, the output light source may be directed toward the tympanic membrane. Alternatively, the adapter module can be configured for placement on the support structure 110 or 210, for example along the extension 116 or 216. The elongate element 230 may extend from the module to the ear canal opening and into the ear canal, for example.

Figure 4:
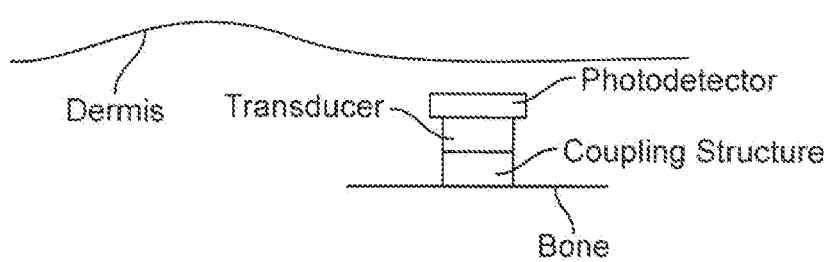
FIG. 4 shows an example of an output transducer assembly configured for bone conduction, in accordance with some embodiments.

FIG. 4 shows an output transducer assembly configured for bone conduction, in accordance with some additional embodiments. The contact hearing assembly may comprise a photodetector, a transducer, and a structure to couple the transducer to bone, for example. In many embodiments, the coupling structure or structure is anchored to the bone, for example. The contact transducer assembly may be implanted and may be coupled to the external light source through the dermis of the user, for example.

The bone conduction transducer assembly can be placed at one or more of many locations. For example the bone conduction transducer assembly can be placed adjacent the ear canal and coupled to bone of the ear canal, for example. Alternatively, the bone conduction contact assembly can be placed on the bone of the user away from the ear canal, such that the bone of the mastoid process.

In the embodiments of the bone conduction assembly, the circuitry may be supported with the extension 230, similar to one shown in reference to FIG. 2B, and the output of the circuitry may extend from an output port of the module to the bone conduction assembly placed on the mastoid process, for example. In many embodiments, the support structure may be fit to the user and the output light port located along the extension, such that the output energy is coupled to transdermally the implanted transducer anchored to the mastoid process.

A person of ordinary skill in the art will recognize that many modifications and arrangements can be provided to provide energy (for example, the light energy, RF, ultrasound or magnetic energy) to the transducer assembly with substantial coupling of the respective energy in accordance with the embodiments disclosed herein.

In reference to the optical implementation, the light energy may comprise one or more of infrared light energy, visible light energy, or ultraviolet light energy, and combinations thereof, for example. In many embodiments infrared or red light energy can be used to penetrate skin and other tissue to a substantial depth.

As will be appreciated by those skilled in the art, various embodiments may be implemented, at least in part, in software, hardware, firmware, or a combination of hardware and software, and it may be carried out in a computer system or other data processing system. Any descriptions should be understood as potentially representing modules, segments, or portions of code which include one or more executable instructions for implementing specific logical functions or elements. If implemented in software, the functions may be transmitted or stored on as one or more instructions or code on a computer-readable medium, these instructions may be executed by a hardware-based processing unit, such as one or more processors, including general purpose microprocessors, application specific integrated circuits, field programmable logic arrays, or other logic circuitry.

While preferred embodiments of the present disclosure have been shown and described herein, it will be obvious to those skilled in the art that such embodiments are provided by way of example only. The various embodiments, implementations and features described can be combined in various ways or used separately. Numerous variations, changes, and substitutions will be apparent to those skilled in the art without departing from the scope of the present disclosure. It should be understood that various alternatives to the embodiments of the present disclosure described herein may be employed without departing from the scope of the present disclosure. Therefore, the scope of the present disclosure shall be defined solely by the scope of the appended claims and the equivalents thereof.

What is claimed is:

1. A wearable communication apparatus, comprising:
a support structure configured to be wearable by a user, wherein the support structure comprises a frame to position one or more displays in front of one or both eyes of the user to view one or more images on the one or more displays and wherein the audio signal corresponds to the one or more images;
a contact transducer assembly configured to produce vibrations of an eardrum, wherein the contact transducer assembly is configured to produce wide bandwidth vibrations and reside on a lateral surface of the eardrum; and
circuitry at least partially positioned on the support structure and configured to drive the contact transducer assembly with an audio signal from an output transducer coupled to the circuitry;
wherein the output transducer comprises a magnetic field generator configured for positioning in an ear canal of the user, the magnetic field generator generating an electromagnetic signal wherein the electromagnetic signal provides both power and signal to the contact transducer;
wherein the output transducer is shaped and configured to provide a widely vented ear canal such that ambient sound passes to the eardrum of the user;
wherein the circuitry is adapted to produce a display audio signal corresponding to the one or more images;
wherein the circuitry generates the display audio signal and transmits the display audio signal to the contact transducer assembly by means of the electromagnetic signal in order to provide the user with the display audio signal; and
wherein the wearable communication apparatus further comprises one or more microphones to receive ambient sound;
wherein the circuitry receives the ambient sound, amplifies the ambient sound, and transmits amplified ambient sound to the contact transducer assembly by means of the electromagnetic signal in order to provide the user with amplified ambient sound;
wherein the one or more microphones comprises:
a first microphone located on a first side of the support structure to place the first microphone on a first side of the user;
a second microphone located on the support structure to place the second microphone on a second side of the user;
a third microphone located on the first side of the support structure to place the third microphone on the first side of the user; and
a fourth microphone located on the support structure to place the fourth microphone on the second side of the user;
wherein the first microphone is located away from a first ear canal opening and the third microphone is located near the first ear canal opening to detect high frequency spatial localization cues on the first side of the user;
wherein the second microphone is located away from a second ear canal opening and the fourth microphone is located near the second ear canal opening to detect high frequency spatial localization cues on the second side of the user; and
wherein the first, second, third and fourth microphones comprise a directional microphone, the directional microphone being oriented toward a field of view of the wearable communication apparatus.

2. The apparatus of claim 1, wherein the contact transducer is configured to produce wide bandwidth vibrations of the ear in a bandwidth comprising low frequencies below 200 Hz and high frequencies above 6 kHz.

3. The apparatus of claim 2, wherein the bandwidth comprises low frequencies below 500 Hz and high frequencies above 5 kHz.

4. The apparatus of claim 1, wherein the support structure comprises a nose engaging structure to engage a nose of the user, an ear engaging structure to engage an ear of the user, and an extension extending between the ear engaging structure and the nose engaging structure.

5. The apparatus of claim 1, further comprising an elongate element sized to extend from the support structure to an ear canal of the user, the elongate element configured to transmit the audio signal from the extension to the ear canal of the user, the elongate element comprising one an electrical conductor to transmit the audio signal.

6. The apparatus of claim 1, wherein the circuitry comprises wireless communication circuitry configured to provide power and the audio signal to the contact transducer assembly in order to drive the contact transducer assembly with the power and signal.

7. The apparatus of claim 1, further comprising: a module to receive the audio signal, the audio signal comprising an analog audio signal, the module comprising, a first circuitry to convert the analog audio signal into an electromagnetic signal, an electromagnetic generator to transmit the electromagnetic signal to the contact transducer assembly, power circuitry to receive the audio signal and provide power to the first circuitry and the electromagnetic generator; wherein the module provides power and the audio signal to the contact transducer assembly in order to drive the contact transducer assembly with the electromagnetic signal and power from the electromagnetic generator.

8. The apparatus of claim 1, wherein the circuitry is removably supported with the support structure.

\* \* \* \* \*